United States Patent [19]
Wolf, Jr. et al.

[11] 3,879,293
[45] Apr. 22, 1975

[54] MEMBRANE DIFFUSION DEVICE HAVING INFLATABLE MEMBER FOR PRESSURIZATION AND SEALING

[75] Inventors: Ludwig Wolf, Jr., Barrington; Robert G. Seaverns, Wheeling, both of Ill.

[73] Assignee: Baxter Laboratories, Inc., Morton Grove, Ill.

[22] Filed: June 20, 1974

[21] Appl. No.: 481,081

[52] U.S. Cl. ................. 210/321; 210/350; 210/493
[51] Int. Cl. ............................................ B01d 31/00
[58] Field of Search ............ 210/321, 350, 351, 493

[56] References Cited
UNITED STATES PATENTS

| | | | |
|---|---|---|---|
| 3,585,131 | 6/1971 | Esmond | 210/493 X |
| 3,723,305 | 3/1973 | Radford | 210/493 X |
| 3,743,097 | 7/1973 | Sausse | 210/350 X |
| 3,788,482 | 1/1974 | Markley | 210/493 X |

*Primary Examiner*—Frank A. Spear, Jr.
*Attorney, Agent, or Firm*—Garrettson Ellis

[57] ABSTRACT

A membrane diffusion device such as a membrane oxygenator is disclosed which comprises a stack of flat membrane wall pairs and flat membrane supports in alternating, interleaving relation. The stack is disposed in a casing and includes an inflatable member disposed between the opposite major faces of the stack and the casing. A flow conduit provides communication between the inflatable member and the exterior through the casing, to permit pressurization of the opposite major faces of the stack while simultaneously providing sealing for the same faces.

7 Claims, 6 Drawing Figures

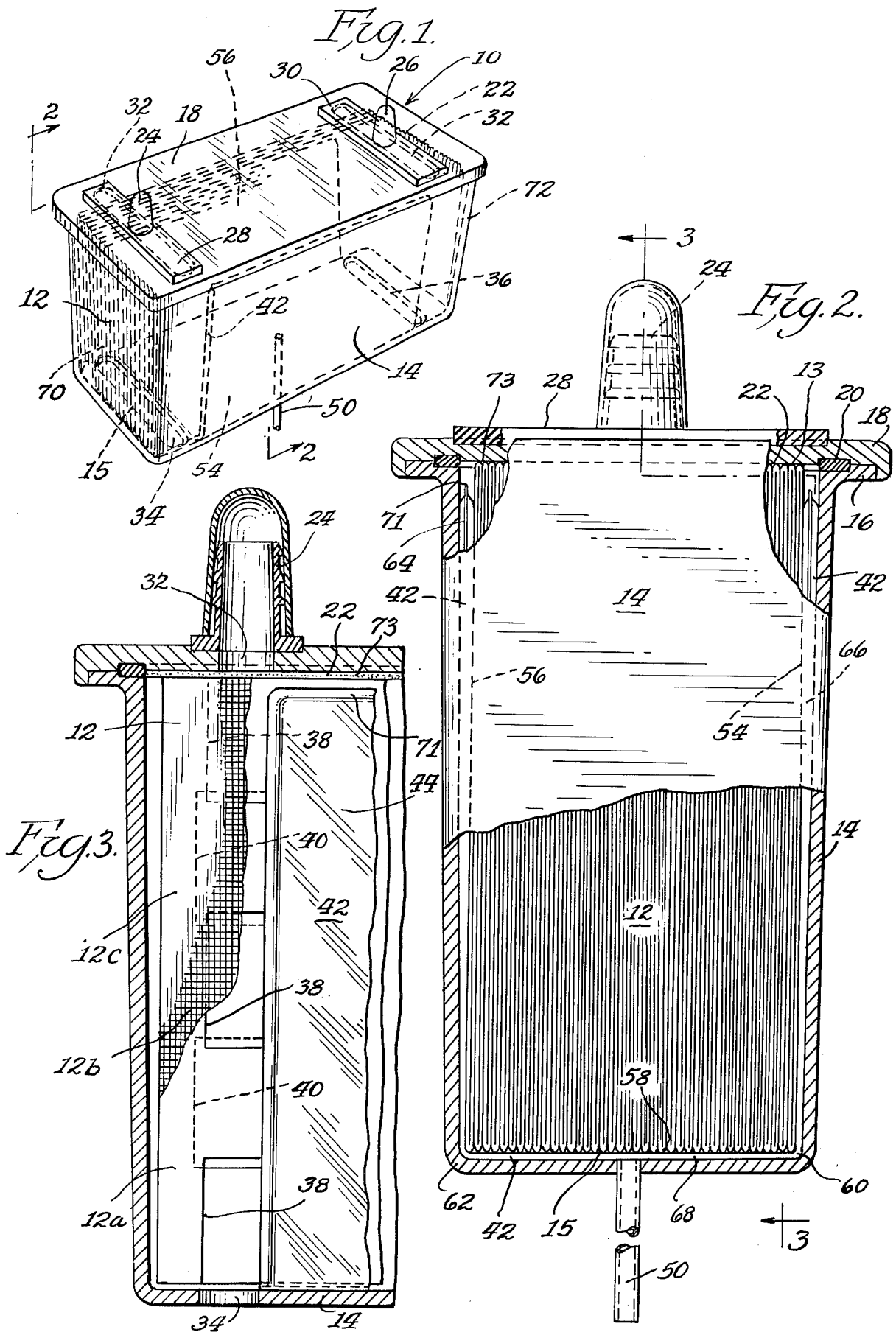

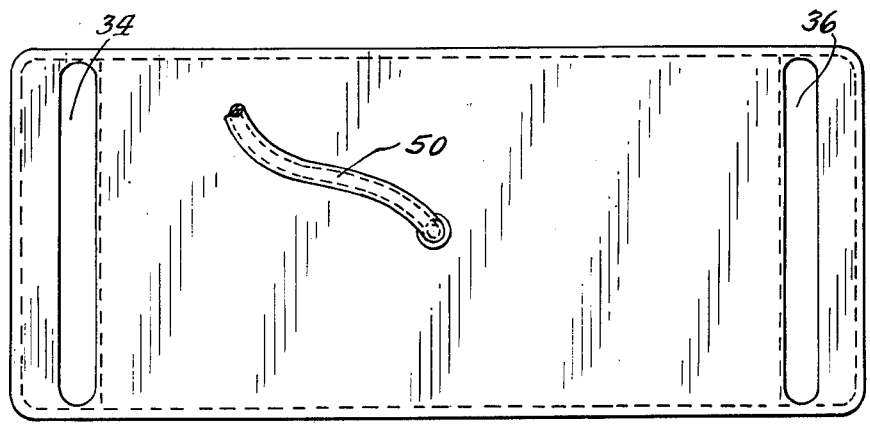
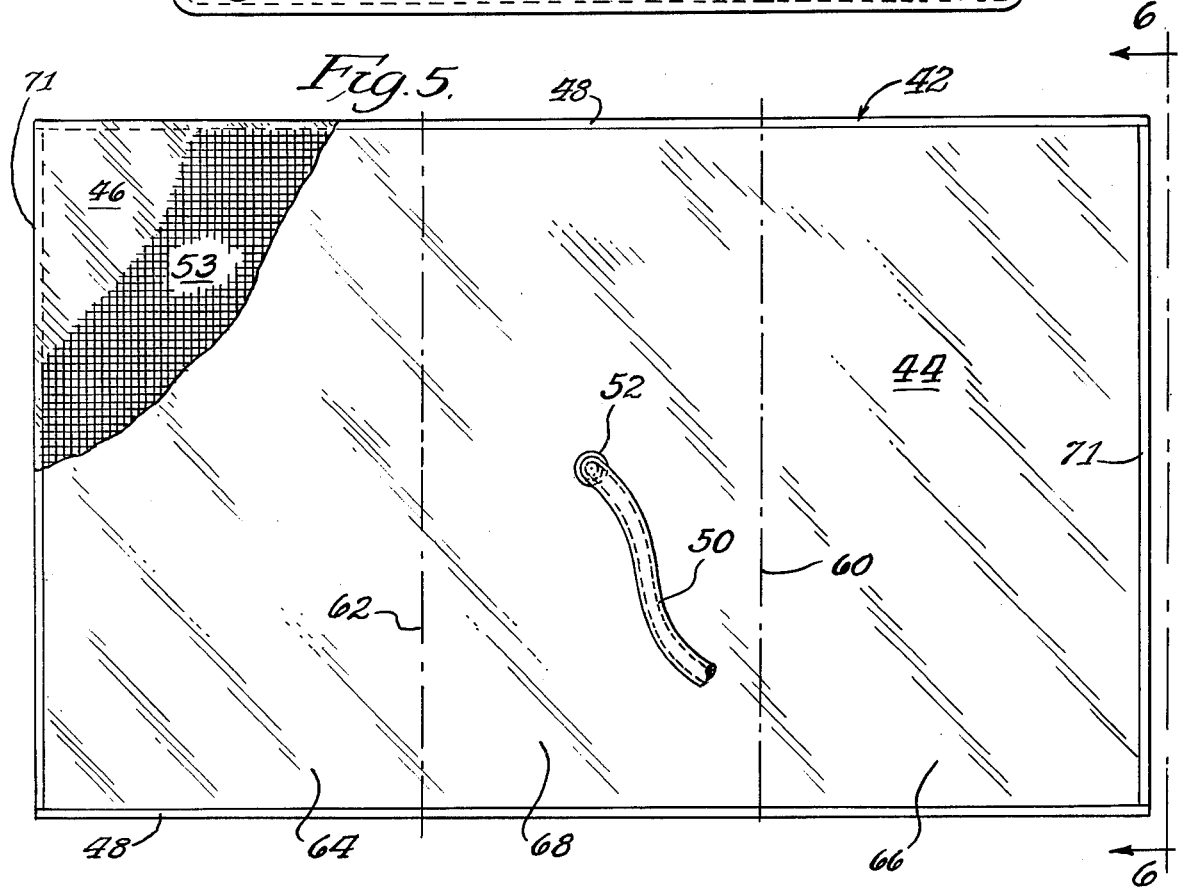
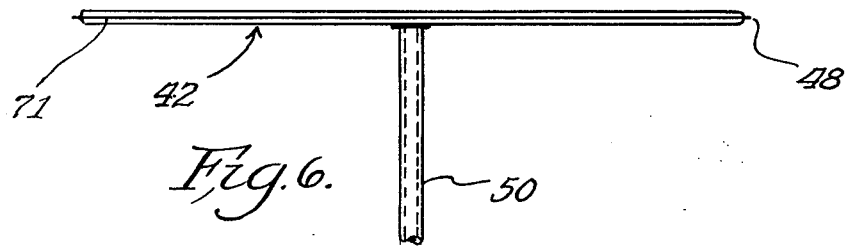

MEMBRANE DIFFUSION DEVICE HAVING INFLATABLE MEMBER FOR PRESSURIZATION AND SEALING

BACKGROUND OF THE INVENTION

Membrane diffusion devices for blood, such as blood oxygenators and artificial kidneys, generally are placed in operation under compression of one sort or another so that the pressure of the blood in the blood flow path does not cause the flow path to increase in thickness, which reduces the efficiency of the processing of the blood. In particular, inflatable shims are frequently used in both blood oxygenators and dialyzers for this purpose, so that the blood film thickness can be controlled as desired by selective pressurization of the shim.

However, in the stacked plate type membrane diffusion devices, a single shim has been typically placed in a position in the middle or to one side of the stack. As a result of this, the top and bottom edges of the stacked membranes do not receive adequate pressurization by the shim, since the shim tends to shorten slightly as it inflates.

In accordance with this invention, the above disadvantage can be greatly reduced in effect. Furthermore, this invention provides an inflatable shim which simultaneously acts as a seal around three or more sides of the stacked device. Accordingly, a simpler casing, with fewer gaskets and potting materials, can be utilized, since the inflatable shim, as used in this invention, also accomplishes sealing functions.

DESCRIPTION OF THE INVENTION

In accordance with this invention, a membrane diffusion device, such a blood oxygenator or an artificial kidney dialyzer, is disclosed which comprises a stack of flat membrane wall pairs and flat membrane supports in alternating, interleaving relation. The stack is disposed in a casing and carries an inflatable member. In accordance with this invention, the inflatable member is disposed between the two opposite major outer faces of the stack and the inner walls of the casing.

A flow conduit communicates between the exterior and the inflatable member, which permits the pressurization of the opposite major faces of the stack. Preferably, the inflatable member used in the diffusion device of this invention comprises a pair of plastic sheets sealed together at their edges and folded about the stack of membrane wall pairs and supports, to overlie the opposite major faces of the stack, as well as a side face of the stack disposed between the opposite major faces. The flow conduit mentioned above can include a tube communicating with the interior of the pair of plastic sheets at a position adjacent the side face of the stack which is overlaid by the inflatable member.

IN THE DRAWINGS

FIG. 1 is a perspective view, with some inner parts shown in phantom, of a membrane oxygenator diffusion device constructed in accordance with this invention.

FIG. 2 is an elevational view taken from one end of the device of FIG. 1, partly in vertical section, as indicated by Line 2—2 of FIG. 1.

FIG. 3 is a partial sectional view of one end of the device illustrated in the previous drawings, taken along Line 3—3 of FIG. 2.

FIG. 4 is a bottom plan view of the device of FIG. 1.

FIG. 5 is a plan view of the inflatable shim used in this invention, prior to assembly into a membrane diffusion device.

FIG. 6 is an inverted elevational view of the shim of FIG. 5, viewed as indicated from Line 6—6 of FIG. 5.

Referring to the drawings, FIGS. 1 through 4 show a membrane oxygenator 10 for blood which may comprise a convoluted stack 12 of flat membrane wall pairs and flat membrane supports in alternating, interleaving relation. The membrane wall pairs and membrane supports may be constructed from a single strip of membrane and membrane support screening lying against a flat, prefolded backing for convolution in the manner shown and described in U.S. Pat. No. 3,757,955, to achieve a stack 12 having a plurality of pocket-like fluid flow channels 13 for blood on one side of the membrane, and a plurality of interleaving flow channels 15 for oxygen on the other side of the membrane.

Stack 12 is disposed in a casing 14 which may comprise a unitary, integral, open-topped box made of molded plastic or the like for receiving the stack. Casing 14 has a flange 16 about its open top for sealingly receiving a closure means such as lid 18 in a hermetically sealed arrangement, after insertion of stack 12 into container 14. O-ring seal 20, which may be made from room temperature vulcanizing silicone elastomer, is provided to assist in the hermetic seal, while lid 18 may be glued or heat sealed to flange 16.

During assembly, the under surface 22 of lid 18 is coated with an adhesive such as room temperature vulcanizing silicone elastomer for potting the upper edge of stack 12 of membrane wall pairs and supports, for additional sealing.

Lid 18 also carries ports 24, 26, enclosed in sterile seal covers, for connection to blood inlet and blood outlet lines. Ports 24, 26 are carried by cross members 28, 30, which in turn seal elongated manifold ports 32 defined in lid 18, which extend laterally the width of stack 12, for manifolding flow communication with each blood flow channel 13 between membrane pairs, thus serving respectively as an inlet and an outlet manifold for blood to and from the flow channels 13.

Oxygen path manifold ports 34, 36, comprise laterally extending slots in the bottom of casing 14. In the embodiment shown, the slots are open and elongated to prevent simple connection with a tubular source of oxygen for reasons of safety, as described in co-pending U.S. patent application of Ronald J. Leonard Ser. No. 435,143, filed Jan. 21, 1974. The oxygenator unit of this invention can be used in conjunction with apparatus described in that application, which is currently on sale by Travenol Laboratories, Inc., of Morton Grove, Ill. Such apparatus provides oxygen in a safe and effective manner so that the currently preferable porous diffusion membranes such as porous polytetrafluoroethylene film of about 0.004 inch thickness, having pores about 1 micron in size, can be safely used. Another preferred type of porous oxygenation membrane which can be used in the diffusion device oxygenator unit of this invention, in conjunction with the apparatus described in the patent application cited above, is polypropylene film of about 0.001 to 0.002 inch thickness, having a pore size of about 0.1 micron. Gas diffusion through such porous, hydrophobic films takes place with great rapidity, when compared with other known oxygenator membranes such as silicone film or the like, although such membranes may also be used in the diffusion device of this invention, if desired.

FIG. 3 shows a broken away portion of stack 12, which is fully described in U.S. Pat. No. 3,757,955 cited above. A stiff, folded backing 12a supports flexible screening 12b, which, in turn, is overlaid with membrane 12c with the oxygen flow-contacting side of membrane 12c being that side of the membrane facing screening 12b. The three-layered arrangement of backing, screening, and membrane is folded as one flat, sheet-like member into a convoluted arrangement as shown in FIG. 2, to define interleaving pockets or flow paths 13, 15 on opposite sides of membrane 12c. Blood flow is through a pocket 13 defined within a membrane well pair.

As described in the patent cited above, cut-away portions 38, 40 are defined in separate, adjacent sections of stiff backing 12a to cooperatively define a manifold channel for each flow path of the stack which extends the entire depth of the stack, to contribute to the flow efficiency of both blood and oxygen gas through the membrane diffusion oxygenator unit.

In accordance with this invention, an inflatable shim member 42 is provided to selectively pressurize stack 12, to counterbalance the pressure of blood flowing through the stack, which tends to expand the stack and thicken the blood flow channels in an undesirable manner. The specific embodiment of shim member 42 shown comprises a pair of plastic sheets 44, 46, sealed together at their edges 48 by a heat seal or the like to provide an inflatable member. A tube 50 communicates with the interior of inflatable member 42 through plastic sheet 44 by means of an appropriate junction seal 52 between tube 50 and plastic sheet 44. This serves as an inflation device, so that when assembled into a membrane diffusion device, tube 50 protrudes through an aperture in the bottom of casing 14, so that member 42 may be inflated from the exterior of the diffusion device as desired. Inflatable member 42 also includes a strip of woven, vinyl-coated, glass fiber screening 53 or the like between sheets 44, 46, to serve as means for facilitating uniform gas flow distribution within the inflatable member 42.

As installed in the diffusion device, inflatable member 42 is folded about stack 12 to overlie the opposite major faces 54, 56 of stack 12, as well as a side face 58 at the bottom of the stack which is disposed between the major faces 54, 56. To accomplish this, the bag is folded along two lines 60, 62 into three sections: two terminal sections 64, 66, and one intermediate section 68, so that a cross section of inflatable member 42 assumes a U-shaped configuration, as indicated in FIG. 2. Accordingly, when inflated through tube 50, all three sections 64, 66, 68 of inflatable member 42 are pressurized, causing the stack 12 to be compressed between inflated sections 64, 66. Simultaneously, stack 12 is urged upwardly by the inflation of section 68 (as shown in FIG. 2), so that during operation, stack 12 is forced into firm, pressurized sealing relation with the sealed layer of vulcanized elastomer on the underside 22 of lid 18. Accordingly, the stresses of operation are less likely to rupture the bond between stack 12 and the seals of surface 22, which is adjacent the many blood flow paths 13 through stack 12.

Likewise, the U-shaped configuration of inflation member 42 provides sealing along most of side or bottom face 58 of the stack, which generally reduces or eliminates the need for potting with rubber sealant or the like in that area, which is a significant manufacturing advantage.

Likewise, the bottom surface 58 of stack 12 is fully pressurized, since the surface is completely enclosed by inflatable member 42. Also, the shortening effect of "pillowing" of member 42 is significantly reduced at its outer ends 71, since the pair of sections 64, 66 each inflate only to one half the thickness of a conventional, single shim. Thus, the "pillowing" or retraction of ends 71 from the top surface 73 of stack 12 for sections 64, 66 is less, providing the area of top surface 73 with more pressurization. Typically, for assembly convenience, the uninflated outer ends 71 are designed to be spaced about 1/8 inch below upper surface 73 of stack 12, although closer tolerances can be achieved, if desired, or ends 71 can even overlap surface 73.

Casing 14 is tapered slightly outwardly toward its open top, for ease of molding. This can be done, since the differential space thickness resulting from such tapering can be filled by the pair of inflatable sections 64, 66 without ill effect.

The elongated strips of membrane or membrane support which are folded together in convoluted manner define flow channel pockets 13, 15, as described in the patent previously cited, for defining the plurality of first flow channels 13 extending transversely of the membrane strip on one side thereof and the plurality of second flow channels 15 extending transversely of the membrane strip on the other side in contact with the membrane support. The inflatable member 42 is spaced from the transversely disposed side faces 70, 72 of stack 12, to permit flow manifolds in the area of cut-away portions 38, 40 to be formed adjacent the ends of the first and second flow channels, for fluid communication with those flow channels. In this area, the pressurizing action of inflatable member 42 is not desired, since blood and oxygen flow channels of increased depth are desirable for abundant supply of the respective fluids to the respective flow paths through stack 12.

The above has been offered for illustrative purposes only, and should not be considered as limiting the invention of this application, which is described in the claims below.

That which is claimed is:

1. In a membrane diffusion device which comprises a stack of flat membrane wall pairs and flat membrane supports in alternating, interleaving relation, said stack being disposed in a casing, the improvement comprising:

an integral inflatable member disposed between opposite major faces of stack and the interior walls of said casing, and also disposed between a side face of the stack, which is disposed between said major faces, and the interior wall of said casing, and a flow conduit communicating with the exterior, and also communicating with said inflatable member, to permit pressurization of said opposite major faces of the stack while simultaneously providing sealing for said major faces and said side face.

2. The membrane diffusion device of claim 1 in which said inflatable member comprises a pair of plastic sheets sealed together at the edges and folded about said stack.

3. The membrane diffusion device of claim 2 in which said inflatable member carries means for facilitating even fluid flow distribution within said member.

4. The membrane diffusion device of claim 3 in which said fluid flow distribution means comprises screening carried within said inflatable member.

5. The membrane diffusion device of claim 3 in which said flow conduit includes a tube communicating with the interior of said pair of plastic sheets adjacent said side face of the stack.

6. The membrane diffusion device of claim 5 in which said stack comprises a flexible, elongated strip of membrane lying against a flexible, elongated strip of membrane support, said membrane and membrane support strips being folded in convoluted, pocket forming array, said inflatable member disposed between said opposite major faces and the casing being spaced from the side faces of said stack which are transversely disposed relative to said membrane strip, to permit flow manifolds to be formed adjacent the transverse edges of said membrane strip for fluid communication therewith.

7. The membrane diffusion device of claim 6 in which said casing comprises a unitary, integral, open-topped box for receiving stack, and closure means for sealing said open top.

* * * * *